(12) United States Patent
Hoffmann

(10) Patent No.: US 11,255,258 B2
(45) Date of Patent: Feb. 22, 2022

(54) INTERNAL COMBUSTION ENGINE HAVING ADJUSTABLE LINKING OF ITS ENGINE UNITS

(71) Applicant: Fuelsave GmbH, Walldorf (DE)

(72) Inventor: Dirk Hoffmann, Buchholz i.d.N. (DE)

(73) Assignee: FUELSAVE GMBH, Walldorf (DE)

( * ) Notice: Subject to any disclaimer, the term of this patent is extended or adjusted under 35 U.S.C. 154(b) by 0 days.

(21) Appl. No.: 17/277,076

(22) PCT Filed: Sep. 25, 2019

(86) PCT No.: PCT/EP2019/075830
§ 371 (c)(1),
(2) Date: Mar. 17, 2021

(87) PCT Pub. No.: WO2020/064817
PCT Pub. Date: Apr. 2, 2020

(65) Prior Publication Data
US 2021/0317779 A1    Oct. 14, 2021

(30) Foreign Application Priority Data
Sep. 25, 2018 (EP) .................... 18196559

(51) Int. Cl.
*F02B 53/04* (2006.01)
*F02B 53/06* (2006.01)
(Continued)

(52) U.S. Cl.
CPC .............. *F02B 53/04* (2013.01); *F01C 20/02* (2013.01); *F02B 53/06* (2013.01); *F02B 53/10* (2013.01); *F02M 26/14* (2016.02)

(58) Field of Classification Search
CPC .......... F02B 53/04; F02B 53/06; F02B 53/10; F01C 20/02; F02M 26/14
See application file for complete search history.

(56) References Cited

U.S. PATENT DOCUMENTS 8,662,052 B2 * 3/2014 Garside .................. F02B 53/00
123/245
9,353,679 B2    5/2016 Hruschka
(Continued)

FOREIGN PATENT DOCUMENTS

EP    1887184 A2    2/2008
EP    2252783        9/2009
(Continued)

OTHER PUBLICATIONS

International Search Report and Written Opinion for PCT Application No. PCT/EP2019/075830, dated Nov. 27, 2019, 7 pages.

*Primary Examiner* — Audrey B. Walter
(74) *Attorney, Agent, or Firm* — Hoffman Warnick LLC

(57) ABSTRACT

An internal combustion engine has a plurality of engine units, each having a working space, in which two rotary pistons are arranged so as mesh with each other and thereby divide the working space into an inflow region and an outflow region. Each engine unit has a closable inlet opening to the inflow region and a closable exhaust gas outlet opening. The internal combustion engine further includes a feed-line pipe to the inlet openings and an exhaust gas collection pipe connected to the exhaust gas outlet openings, so that the engine units are connected in parallel with each other. The internal combustion engine further includes exhaust gas lines which connect the engine units with each other in series. In certain cases, a control device operates some of the engine units either as internal combustion engines, or as expansion engines.

14 Claims, 5 Drawing Sheets

(51) Int. Cl.
F02B 53/10 (2006.01)
F01C 20/02 (2006.01)
F02M 26/14 (2016.01)

(56) References Cited

U.S. PATENT DOCUMENTS

2017/0321554 A1* 11/2017 Wong .................... F01C 11/002
2018/0258768 A1* 9/2018 Hoffmann ................. F01N 5/04

FOREIGN PATENT DOCUMENTS

| EP | 3144471 A1 * | 3/2017 | ............... F01N 5/04 |
| GB | 576603 | 4/1946 | |
| WO | 02/070878 A1 | 9/2002 | |
| WO | 2008/071326 A1 | 6/2008 | |

* cited by examiner

INTERNAL COMBUSTION ENGINE HAVING ADJUSTABLE LINKING OF ITS ENGINE UNITS

FIELD OF THE INVENTION

The present invention relates to an internal combustion engine and to a method for operating an internal combustion engine. The invention is based on an internal combustion engine comprising one or a plurality of rotary piston engine units.

RELATED ART

DE 10 2007 019 958 A1 discloses for example a rotary piston engine which in some embodiments can also function as an internal combustion engine. In such an engine the pressure arising through the combustion drives two intermeshing rotary pistons. DE 10 2007 019 958 A1 additionally describes an arrangement wherein two rotary piston engine units are flowed through in series one behind the other.

SUMMARY OF THE INVENTION

In general an internal combustion engine that is constructed from rotary piston engines is intended to have a particularly high level of efficiency over a greatest possible power range.

It can be regarded as an object of the invention to indicate a particularly efficient internal combustion engine and a method for operating it.

This object is achieved through the internal combustion engine and through the method disclosed according to various implementations.

Advantageous variants of the internal combustion engine according to various implementations of the invention and the method according to various implementations of the invention will also be explained in the following description.

According to various implementations of the invention an internal combustion engine comprises a plurality of engine units. Each engine unit has a working space in which two rotary pistons are arranged so as to mesh with each other and thereby divide the working space into an inflow region and an outflow region. The rotary pistons can thereby be driven by fluid flowing through. The fluid is exhaust gas produced through the combustion of a fuel-air mix in the respective engine unit or in a component upstream of the engine unit. Each engine unit further comprises a closable inlet opening leading to the inflow region and a closable exhaust gas outlet opening leading away from the outflow region. The internal combustion engine according to the invention further comprises a feed-line pipe which is connected to the inlet openings, and an exhaust gas collection pipe which is connected to the exhaust gas outlet openings so that the engine units are interconnected parallel to each other. In addition, the internal combustion engine comprises exhaust gas lines, each leading from an outflow region of one of the engine units to an inflow region of another of the engine units, a serial connection thereby being produced between the engine units. A first engine unit of the engine units can also have just an exhaust gas line to carry away exhaust gas here without an exhaust gas line of another engine unit opening into this first engine unit. Correspondingly just an exhaust gas line can open into a last one of the engine units without an exhaust gas line leading away here. Alternatively, however, the first and the last engine unit can also be formed identically to the other engine units, wherein in particular the serial connection can produce a loop. The internal combustion engine also comprises a control device which is designed to operate at least some of the engine units, in dependence upon a desired power output, either as an internal combustion engine, wherein the inlet opening of the respective engine unit is opened to the feed-line pipe, or as an expansion engine, wherein the respective inlet opening remains closed and the respective rotary pistons are instead driven by exhaust gas which flows in via the respective exhaust gas line.

In a method according to various implementations of the invention for operating an internal combustion engine, an internal combustion engine as described above is provided. In this method the control device sets variably, in dependence upon a desired power output, how many of the engine units are operated as internal combustion engines, wherein the inlet opening of the respective engine unit is opened to the feed-line pipe, or operated as expansion engines, wherein the respective inlet opening remains closed and the respective rotary pistons are instead driven by exhaust gas which flows in via the respective exhaust gas line.

Various implementations of the invention allows engine units to be used either in parallel or in series. It is possible to switch between these modes during ongoing operation, for which purpose it is only necessary for the corresponding closable lines to be either opened or closed. The operation of the internal combustion engine according to the invention hereby differs fundamentally from the operation of conventional multicylinder reciprocating engines. In the latter, some cylinders are deactivated at partial load and do not contribute to the driving propulsion. Due to being connected to the drive train, they are carried along, which does not have a positive effect upon the level of efficiency. In the invention, on the other hand, use is also made of those engine units in which in a partial load operation no combustion takes place (or, in the case of an external mix formation and an ignition upstream from the engine unit: those engine units of which the inlet opening from the combustion chamber remains closed). These engine units can be flowed through in the invention by exhaust gas of the other engine units and are thus driven by the exhaust gas pressure or respectively the exhaust gas energy.

In this way the internal combustion engine gives rise straightaway at partial load to two relevant advantages: the exhaust gas pressure of one engine unit can still be used by another engine unit, thereby increasing the level of efficiency; in addition, the number of engine units is defined by a maximum desired power of a full load operation—therefore the engine units which are used as expansion engines in the partial load operation are present anyway and would otherwise be carried along. With a defined maximum power therefore no substantial additional costs on apparatus are required in order to achieve a significantly increased efficiency in the partial load operation.

The control device can be designed to operate, in dependence upon a desired output power, a variable number of engine units as internal combustion engines and the other (or some of the other) engine units as expansion engines. In particular for a maximum possible power, all engine units can be operated as internal combustion engines and, with a decreasing power, fewer and fewer engine units can be used as internal combustion engines and be used instead as expansion engines. The number of engine units can be selected according to the intended maximum power and can for example be at least three or four or also more engine units.

All engine units can be connected to a common drive shaft. In particular it can be provided that in each case one of the rotary pistons of each engine unit is connected to the drive shaft. Via the drive shaft an apparatus, which can in principle be any desired apparatus, can be driven, for example a vehicle, a generator for power generation or a ship.

For some or all of the engine units an exhaust gas line can be provided in each case, which leads from the outflow region (thus the region behind the rotary pistons of this engine unit) to an inflow region of another engine unit. The exhaust gas lines can lead either directly to the inflow region or lead, via components located in-between, for example a combustion chamber, to the inflow region. A serial connection is thus produced. Exhaust gas can be directed from a first engine unit via the associated exhaust gas line to the second engine unit, driving the rotary pistons there and then being either output to the exhaust gas collection line or directed via the next exhaust gas line to the third engine unit (or directed partly to the exhaust gas collection line and partly to the third engine unit).

The control device can be designed to close the exhaust gas outlet opening of one of the engine units to the exhaust gas collection pipe and to guide exhaust gas solely via the associated exhaust gas line to the subsequent engine unit if this subsequent engine unit is operated as an expansion engine. In somewhat more general terms, the exhaust gas outlet opening of an engine unit can be kept closed and more exhaust gas thereby being guided via the associated exhaust gas line to the subsequent engine unit if this subsequent engine unit is operated as an expansion engine, compared with the case in which this subsequent engine unit is operated as an internal combustion engine. In practice this can mean that the control device closes the exhaust gas outlet opening of the first engine unit to the exhaust gas collection pipe if the second engine unit is operated as an expansion engine, or at least directs more exhaust gas of the first engine unit to the second engine unit than in the case of operation of the second engine unit as an internal combustion engine, i.e. as an internal combustion engine unit.

Depending upon the design of the engine units, the design of the feed-line pipe can differ. For example, it can be provided that via the feed-line pipe fresh air or a fuel-air mix is supplied to the engine units. Alternatively, it can also be provided that a fuel-air mix is ignited already in the feed-line pipe and the exhaust gases hereby produced are fed via the closable inlet openings to the engine units.

If fresh air (without fuel) is supplied via the feed-line pipe, each engine unit can comprise an injection nozzle for injecting fuel that is burned within the engine unit. With the injection nozzle, therefore, fuel is injected into a region between the closable inlet opening and the rotary pistons. This region can be the working space of the rotary pistons or also an optional combustion chamber which is located between the closable inlet opening and the working space. The control device can be designed, if an engine unit is operated as an internal combustion engine, to inject fuel and to open the inlet opening to the feed-line pipe and, if the engine unit is operated as an expansion engine, not to inject any fuel and not to open the inlet opening to the feed-line pipe. Instead, the exhaust gas outlet opening of a respectively preceding engine unit is closed to the exhaust gas collection pipe, in order that exhaust gas of the preceding engine unit can be directed via the associated exhaust gas line to this engine unit operated as an expansion engine.

If, alternatively, a fuel-air mix is supplied via the feed-line pipe this can in turn be burned in the working space or in an optional combustion chamber. The control device can be designed in this configuration so that, if an engine unit is operated as an internal combustion engine, the fuel-air mix is introduced via the inlet opening and burned in this engine unit, and, if an engine unit is operated as an expansion engine, no fuel-air mix is let in via the closable inlet opening and instead the exhaust gas outlet opening of a respectively preceding engine unit is closed so that exhaust gas of the preceding engine unit is received via the corresponding exhaust gas line.

In order to ignite the fuel, each engine unit can have an ignition device which is arranged in the working space or in the optional combustion chamber. The ignition device can for example be a spark plug or a laser for ignition. In principle an auto-ignition can also be realised without an ignition device. The fuel used can in principle be arbitrary, in particular oil-containing, such as petrol or diesel, or also comprising natural gas or hydrogen gas. The burned fuel-air mix can be a mixture of fuel and fresh air or also a mixture of fuel and oxygen gas.

In an alternative embodiment the fuel-air mix is ignited in the feed-line pipe. Fewer ignition devices are hereby required, in particular a single spark plug on the feed-line pipe can suffice. An inlet valve to the feed-line pipe can be closed if the ignition takes place in the feed-line pipe. Those engine units which are operated as expansion engines remain closed to the feed-line pipe. Only those engine units that are operated as internal combustion engines are now opened to the feed-line pipe so that the exhaust gases produced there through combustion flow through the opened inlet openings into the respective engine units and are guided from there via the exhaust gas lines onwards to the engine units that are operated as expansion engines.

The selection of which of the engine units are operated as expansion engines can be realised in that an engine unit operated as an expansion engine is as far as possible always preceded by an engine unit operated as an internal combustion engine. The control device can, for a partial load operation in which half of the engine units are to be operated as internal combustion engines, select such engine units for operation as internal combustion engines that there is always one engine unit operated as an expansion engine located between two engine units operated as internal combustion engines. For example, at least four engine units can be provided, wherein in each case an exhaust gas line leads from one of the engine units to the next respective engine unit, and the control device can, for a partial load operation in which two of the four engine units are operated as internal combustion engines, operate the first and the third engine unit as internal combustion engines and operate the second and the fourth engine unit as expansion engines.

For a full load operation, on the other hand, the control device can operate all engine units as internal combustion engines. A mixed operation is also possible, wherein the inlet opening of an engine unit is opened and this engine unit still receives exhaust gas of a preceding engine unit. In order to achieve an as far as possible optimal level of efficiency it may be beneficial, depending upon the required power output, to use some of the engine units in such a mixed operation. In variants it can also be provided that, instead of the operation as an expansion engine, the aforementioned mixed operation is used.

Operational settings can be input in the control device that fix, in dependence upon the desired power output, how much exhaust gas is guided from one of the engine units to the next and whether and/or how much fuel is introduced into the respective engine unit.

The engine units can each comprise a movable closure body which can be moved between different positions, in which it either closes the exhaust gas outlet opening to the exhaust gas collection pipe and opens the exhaust gas line to a subsequent engine unit, or opens the exhaust gas outlet opening to the exhaust gas collection pipe and closes the exhaust gas line to a subsequent engine unit. In this configuration the closable outlet opening is formed by the closure body, said closure body simultaneously also being able to open or shut off the exhaust gas line. The closure body can comprise for example a shutter, a valve or a rotation body, in particular a rotatable slotted roller.

The control device can be designed to close some or each one of the closable exhaust gas outlet openings, in dependence upon a desired output power, in a variable proportion. For example, the proportions in which exhaust gas is output to the exhaust gas collection pipe or via the associated exhaust gas line are set. In particular the control device can realise a setting so that more fuel is supplied to one engine unit than to a subsequent engine unit, the subsequent engine unit here receiving an adjustable proportion of exhaust gas of the first-mentioned engine unit so that its rotary pistons are driven both by the exhaust gas of the previous engine unit and also by the fluids (either exhaust gas or substances to be burned) introduced directly via the inlet opening from the collection pipe.

The control device can realise a setting (in particular through the closable exhaust gas outlet opening of a first engine unit) such that from the first engine unit an increasingly large exhaust gas output to a subsequent, second engine unit and a correspondingly lower exhaust gas output to the exhaust gas collection pipe are realised. This control can be provided at least for a certain operating range. The second engine unit is therefore also operated as an internal combustion engine here.

If there are at least three engine units, it can be provided that leading to the inflow region of one of the engine units are the exhaust gas lines of two other engine units. The former engine unit that can receive exhaust gases in parallel from two other engine units is operated in a partial load operation preferably as an expansion engine. It can thus be ensured that, even at partial load, exhaust gases can be guided as far as possible from each engine unit operated as an internal combustion engine to an engine unit operated as an expansion engine. If for example two of three available engine units are operated as internal combustion engines, these two engine units can further direct exhaust gas to an engine unit operated as an expansion engine only when the latter engine unit comprises two feed-line pipes for exhaust gases of two engine units. The same applies correspondingly to configurations having more than three engine units.

Each engine unit can have a combustion chamber into which the respective inlet opening opens. From the combustion chamber, two channels can lead to the jacket area of the working space in which the rotary pistons are located. The channels can be orientated such that their longitudinal axes point radially further outwards past the axes of rotation of the two rotary pistons. In this way an inflow direction of exhaust gas to the rotary pistons that supports the rotation of the rotary pistons is defined.

In particular in order to avoid thermal damage on sealing strips of the rotary pistons, a cooling of the inflow region of the working space can be provided. In this respect, a fuel line can run adjacently to the inflow region. The fuel line can be formed in the housing that forms the working space and in particular not be separated from the inflow region by any components located in-between. For example, boreholes can be formed in the housing as a fuel line. In order to avoid an unintentional positive ignition, a fuel line can also run adjacently to an optional combustion chamber in front of the working space. Instead of a fuel line it is also possible in principle to use another fluid or liquid line in the described duct for cooling.

In order that an engine unit can be used for the different operating modes described, it is important that it can work efficiently over a large pressure range, i.e. with low friction but still with good sealing of the rotary pistons to the wall of the working space. Friction arises in conventional designs for a substantial part through the sealing of the rotary pistons to the surrounding wall. Against this background it may be preferred if each rotary piston has at least two cavities, in each of which an elastic tube or an elastic rod is received, and if each rotary piston has on its outer circumference at least two sealing strips which project into the cavities and are pushed radially outwards by the elastic tube accommodated therein or by the rod. A longitudinal axis of the elastic tube is thus substantially parallel to the axis of rotation of the rotary pistons. Such a tube offers over its entire length a uniform pressure upon the associated sealing strip. The tube can be formed from rubber or plastic and in any case without metal, so that, in the event of a break in the tube, there is no risk of metal splinters being slung freely through the engine and causing further damage there. Such an elastic (hollow) tube or such an elastic (solid) rod is therefore superior to the conventionally used coil springs or leaf springs. The resilience property of seals via such elastic tubes can be realised in particular as described by the applicant in the European Patent application EP18156764.5, filed on 14 Feb. 2018.

If less than half of the engine units are operated as internal combustion engines, three or more engine units can be connected in series. Exhaust gas from an engine unit operated as an internal combustion engine is thus thereby guided firstly through two or more engine units operated as expansion engines before it is directed via the exhaust gas outlet opening of this last engine unit into the exhaust gas collection pipe.

The control device can also be designed so that, upon a switchover in the operation of an engine unit from operation as an internal combustion engine to operation as an expansion engine, a transmission ratio, with which this engine unit is connected to a common drive shaft of a plurality of, or all, engine units, is simultaneously switched over. In particular the transmission ratio/gears can be changed so that a revolution of this engine unit only causes a smaller rotation of the drive shaft than when this engine unit is operated as an internal combustion engine. In this way it can be taken into account that a flow speed or, respectively, pressure of exhaust gas in a serial operation of two or more engine units decreases over each engine unit.

The engine units can also differ in their working volumes, i.e. in the size of the working space that is not occupied by the rotary pistons. For this, either the rotary pistons of different engine units can have different sizes or the working spaces of different engine units can have different sizes. Upon a switchover of an engine unit from operation as an internal combustion engine to operation as an expansion engine, firstly an engine unit that has a smaller working volume than other engine units can be selected. It is only after all engine units having a smaller working volume have been switched over to operation as an expansion engine and yet more engine units are now to be switched over for a desired reduced power output that switching-over of an engine unit with a larger working volume will be commenced.

Besides the engine units described, the internal combustion engine can also comprise additional engine units, each comprising the described rotary pistons and being connected to the common drive shaft. A possible difference from the engine units described up to now is that these additional engine units can be supplied in particular solely by exhaust gas of the previously described engine units and accordingly cannot comprise the inlet opening described.

The term "expansion engine" is intended to clarify that a use of energy is to be realised here through the expansion of the exhaust gases of another engine unit, whereas, during operation as an internal combustion engine, the energy released through combustion is used directly by the engine unit rather than not being used until it reaches another engine unit. A distinguishing feature in the present case is that an operation as an internal combustion engine is to be understood in that the inlet opening to the feed-line pipe is opened (or is opened and closed at least once for each ignition cycle), whereas during operation as an expansion engine the inlet opening is continuously closed, i.e. it remains closed over the entire combustion cycle of another engine unit.

The closable exhaust gas outlet opening can have a movable closure body of a shape that is, in principle, arbitrary. It can for example be a shutter, a valve or a rotatable slotted roller. The closure body can also be designed, depending on position, to open or close the exhaust gas line coming from the same engine unit. Alternatively, a further closure body can also be provided for this purpose. In principle it is also possible for a movable closure body of an exhaust gas line to also be provided at the end thereof that opens into the subsequent engine unit.

The feed-line pipe can also be referred to as a common rail. For each engine unit it has a fluid connection, via which, depending upon the embodiment, different fluids can be guided into the engine units. In order to build up a sufficient pressure in the feed-line pipe, a compressor or a condenser comprising two rotary pistons in the same way as the other engine units can be provided. The condenser can be connected to the engine units in order to be driven.

The parallel connection of the engine units is intended to express the fact that each engine unit is connected to a common feed-line pipe and to a common exhaust gas collection pipe without a fluid from the feed-line pipe firstly having to flow through one engine unit in order to reach another engine unit. The serial connection via the exhaust gas lines between the engine units on the other hand is to be understood in that a fluid from the feed-line pipe initially flows through a first engine unit (where it is burned if the fluid has not already been ignited in the feed-line pipe or in a pre-combustion chamber upstream of the first engine unit) and then flows through the second engine unit.

The control device can comprise an electronic system, wherein the functionality of said control device can be programmed in arbitrary proportions in software or hardware. In variants it can also be provided that the operations as an internal combustion engine and as an expansion engine differ in whether fuel is burned in the respective engine unit, wherein in both operating modes the inlet opening is opened (and closed again). The "desired output power" can be understood as a defined target output power of the internal combustion engine, in particular also as a target torque of the drive shaft.

The properties described as additional features of the internal combustion engine according to the invention also give rise, with proper usage, to variants of the method according to the invention. In particular the use of the described control device gives rise to corresponding method variants. Conversely, the control device can be designed to carry out described method variants, in particular through corresponding control of the closable inlet openings and exhaust gas outlet openings as well as fuel injections and ignitions.

BRIEF DESCRIPTION OF THE DRAWINGS

Further advantages and features of the invention will be described below by reference to the attached schematic drawings, in which.

The same reference numerals generally identify the same or similar components in the figures.

DETAILED DESCRIPTION OF THE INVENTION

Figure 1:
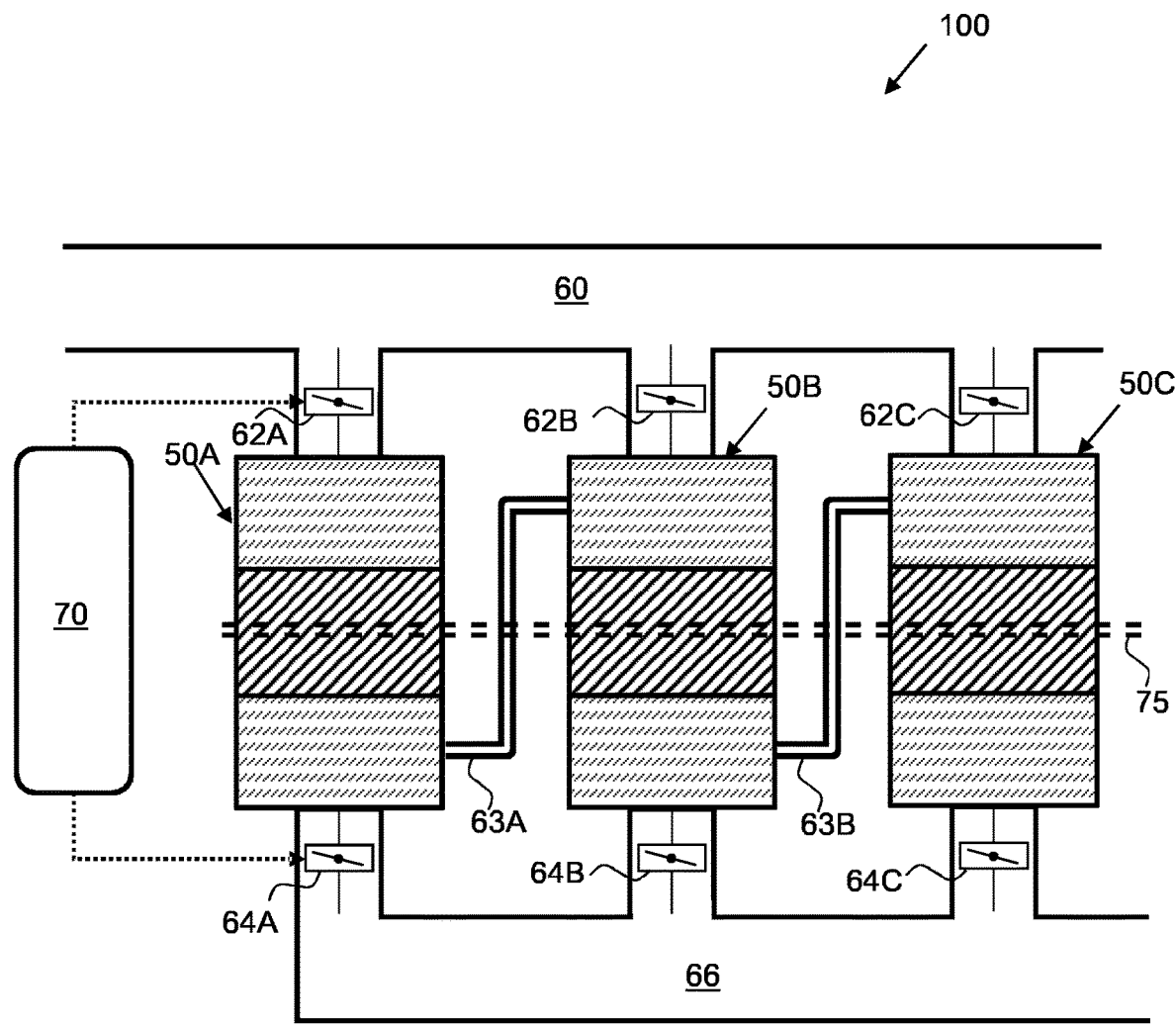
FIG. 1 is a schematic illustration of an exemplary embodiment of an internal combustion engine according to the invention.

FIG. 1 shows an exemplary embodiment according to the invention of an internal combustion engine 100. This comprises a plurality of engine units 50A-50C, each being rotary piston engines having at least two intermeshing rotary pistons. In the example of FIG. 1, a first engine unit 50A, a second engine unit 50B and a third engine unit 50C are shown. Further engine units can follow. The structure of the engine units 50A-50C will be described in more detail further below. A common feed-line pipe 60 is connected to each of the engine units 50A-50C. Depending upon the design of the engine units 50A-50C, fresh air or a fuel-air mix is conveyed via the feed-line pipe. It can also be provided that a fuel-air mix is already ignited in the feed-line pipe 60 and the resulting exhaust gases/combustion fluids are then introduced into the engine units 50A-50C.

An exhaust gas collection pipe 66 can receive exhaust gases output from the engine units 40A-50C via corresponding exhaust gas outlet openings 64A-64C.

The inlet openings 62A-62C from the feed-line pipe 60 to the engine units 50A-50C are designed as closable inlet openings. The exhaust gas outlet openings 64A-64C can likewise be designed to be closable. These are controlled by means of a control device 70.

Further provided are an exhaust gas line 63A from the first engine unit 50A to the second engine unit 50B and a further exhaust gas line 63B from the second engine unit 50B to the third engine unit 50C. The third engine unit 50C (or generally the last engine unit) can optionally comprise in turn an exhaust gas line (not shown) to the first engine unit 50A.

Via the exhaust gas line 63A exhaust gas that has driven the rotary pistons of the first engine unit 50A reaches the second engine unit 50B and drives the rotary pistons thereof. In this way the second engine unit 50B can use exhaust gas energy of the first engine unit 50A.

The control device 70 can switch for each engine unit variably between two operating modes, i.e. switching during ongoing operation of the internal combustion engine 100. In the first operating mode an inlet opening 62B, 62C to an engine unit 50B, 50C is opened (and this engine unit is accordingly driven directly via the combustion of a fuel-air mix). In the second operating mode, on the other hand, the inlet opening 62B, 62C of the respective engine unit 50B, 50C is closed and this engine unit 50B, 50C is correspondingly driven solely by exhaust gases of a preceding engine unit 50A, 50B. The first operating mode is also referred to in the present document as operation as an internal combustion engine, whereas the second operating mode is also referred to as operation as an expansion engine.

In the illustrated example there is no exhaust gas line of another engine unit 50B, 50C leading to the first engine unit 50A, so that the engine unit 50A can always be operated as an internal combustion engine and not as an expansion engine, whereas for all other engine units 50B, 50C this choice is available. In other configurations such a choice can also be provided for the first engine unit 50A.

For the exhaust gas lines 63A, 63B it is likewise possible for a movable closure means to be provided. It can also be provided that a closure of an exhaust gas line 63A and the closable outlet opening 63A are formed by a common component, for example by a shutter valve or another movable body which, in dependence upon its position, opens one of the two and closes the other one, or, in intermediate positions, opens both in variable proportions.

The control device 70 can set whether the engine units 50A-50C are operated in parallel in that all inlet openings 62A-62C are opened, or in series in that for example one inlet opening 62A is opened and the other inlet openings 62B, 62C are closed.

It can be provided that the first exhaust gas outlet opening 64A to the exhaust gas collection pipe 66 is always closed if the second inlet opening 62B is closed. All the exhaust gas of the first engine unit 50A thus reaches the second engine unit 50B. The same may apply correspondingly for the subsequent engine units.

For a full load operation, in particular, all inlet openings 62A-62C can be opened (i.e. being opened and closed again in each cycle corresponding to the combustion cycles). With decreasing power to be output, an increasing number of the inlet openings 62A-62C remain closed, so that the corresponding engine units are driven solely by the exhaust gases of another engine unit and thus contribute to the increase in efficiency.

All engine units 50A-50C can be connected to a common drive shaft 75. All engine units are hereby constantly under pressure of the exhaust gases in contrast with conventional multi-cylinder reciprocating engines, in which any pistons that are not in use at a given moment are not under pressure and have to be carried along, thereby consuming energy.

Figure 2:
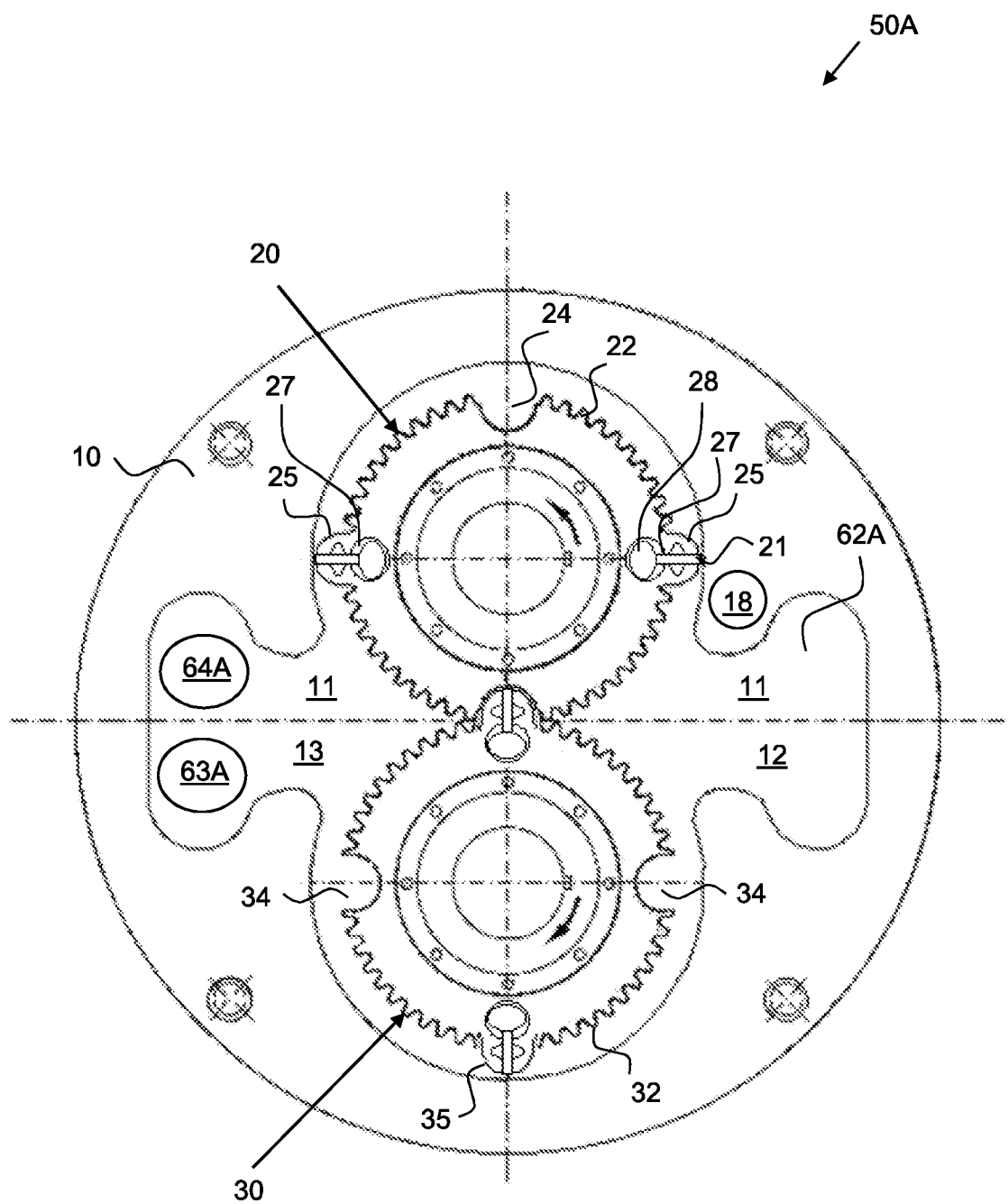
FIG. 2 is a schematic cross-sectional view of an engine unit of an internal combustion engine according to the invention.
Figure 3:
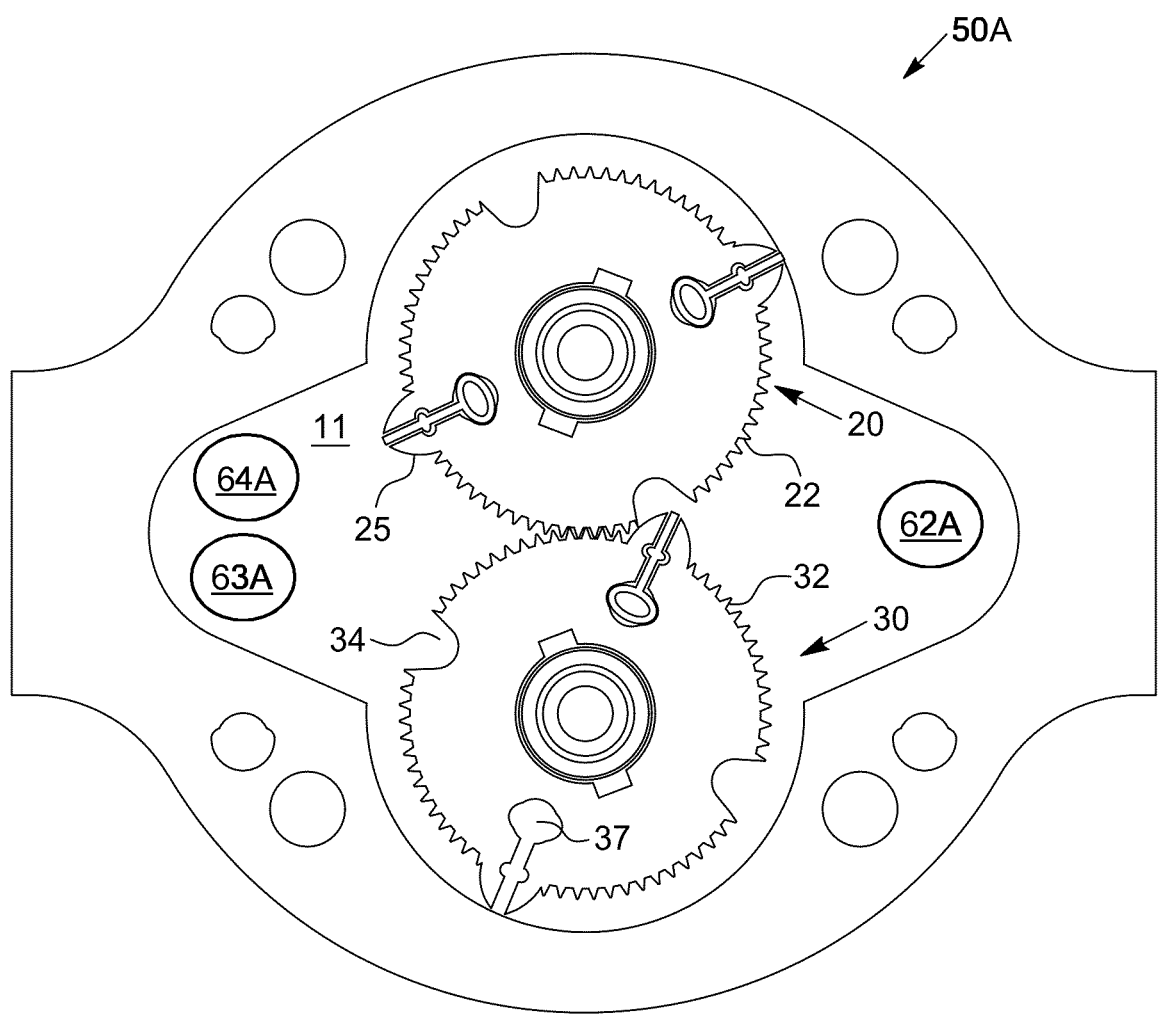
FIG. 3 is a further schematic cross-sectional view of an engine unit of an internal combustion engine according to the invention.

An example structure of an engine unit 50A will be described in more detail by reference to FIGS. 2 and 3. The following configurations may also apply to the other engine units. The engine unit 50A comprises two rotary pistons 20, 30 which rotate together and are driven by a fluid flowing through. The axes of rotation of the two rotary pistons 20, 30 extend through the respective mid-points of the rotary pistons 20, 30. The cross-sectional illustrations of FIGS. 2 and 3 are sectional views perpendicular to these axes of rotation.

The engine unit 50A comprises a housing 10 which forms inside it an interior space 11. The interior space 11 can be formed fluid-tight apart from the inlet opening 62A, the exhaust gas outlet opening 64A and the connection to the exhaust gas line 63A. In the interior space 11 the two rotary pistons 20, 30 are arranged so that they each form a sealing contact with the wall of the interior space 11 and also sealingly contact each other, independently of their momentary rotation position. If a fluid is guided through the inlet opening 62A into the interior space 11 it can consequently only reach the exhaust gas outlet opening 64A and the exhaust gas line 63A if it flows along the rotary pistons 20, 30 and sets these in rotation. The interior space 11 is therefore also described in the present document as the working space 11. The region of the interior space 11 as far as the rotary pistons 20, 30 that is connected to the inlet opening 62A is described as the inflow region 12, with associated fuel line 18. On the other hand, the part of the working space 11 as far as the rotary pistons 20, 30 that is connected to the exhaust gas outlet opening 64A is described as the outflow region 13. The rotation energy of the rotary pistons 20, 30 can be used in a manner that is known in principle for applications that are arbitrary in themselves, for example as a mechanical drive or for the generation of electrical energy by means of a generator.

The two rotary pistons 20, 30 have the same diameter and each of them has on its outer circumference a toothed wheel 22, 32. The two toothed wheels 22, 32 mesh with each other. A seal is hereby achieved between the two rotary pistons 20, 30 and a passage of fluid is prevented in this position. In addition, the two rotary pistons 20, 30 rotate through the toothed wheels 22, 32 synchronously, in opposing directions of rotation.

In addition, each rotary piston 20, 30 has two bulge portions 25, 35 which protrude radially outwards over the respective toothed wheel 22, 32. Besides being interrupted by the bulge portions 25, 35, the two toothed wheels 22, 32 are also interrupted by two depressions 24, 34. In the regions of the depressions 24, 34, the respective rotary piston 20, 30 therefore has a smaller radius. When the rotary pistons 20, 30 rotate together, the bulge portion 35 of one of the rotary pistons 30 engages in the depression 24 of the other rotary piston 20, and vice versa.

Each bulge portion 25, 35 has a slot, in particular in the radial direction. Disposed in each slot is a sealing strip 21, 31 which projects outwardly out of the slot. The sealing strips 21, 31 can, in dependence upon the rotation position of the rotary pistons 20, 30, sealingly contact the wall of the interior space.

The design of the sealing strip and its fixture and resilience means are of great importance for friction and sealing properties of the engine, through which the efficiency of the engine is largely determined.

The slots in which the sealing strips 21, 31 are received open in each case into a cavity 27, 37. In conventional rotary piston engines there is disposed at the end of such slots a spring, for example a coil spring or a leaf spring. However, these cause an uneven pressure: in the axial direction (from the drawing plane) a leaf spring has only in its centre a high pressure, which decreases sharply towards the edge. Coil springs also act selectively, i.e. area-wise. Furthermore, there is the risk—if such a metal spring breaks—of small metal particles penetrating into other parts of the engine and causing severe damage there. These disadvantages are overcome by the provision in each cavity 27, 37 of one or a plurality of tubes 28, 38 consisting of an elastic material such as silicone or rubber. The sealing strip 21, 31 projects as far as, or projects into, the cavity 27, 37 and against the silicone tube. The latter is thereby compressed and exerts a radially outwardly orientated pressure upon the sealing strip 21, 31. In the axial direction this cylindrical tube can have an equal cross-section, so that a uniform pressure is exerted over the axial length. Furthermore, no metal parts are used so that, in the event of the tube breaking, there is no risk of resulting damage to the engine.

FIG. 3 shows, for visualisation purposes, only a single sealing strip with its associated tube on the rotary piston 30, whereas the second cavity 37 and the slot adjacent thereto are shown empty. During use, of course, a tube is also arranged here as a resilience means in the cavity 37 and a sealing strip in the slot.

Each rotary piston can be symmetrically constructed, i.e. the shapes of the bulge portions, sealing strips and depressions to the fluid-inflow side being independent of the direction of rotation of the rotary piston. The engine unit 50A can thereby be operated equally in principle in both directions of rotation. For a change of direction, the introduction of the fluid is reversed, thus being introduced through the exhaust gas outlet opening 64A into the interior space 11 and out through the inlet opening 62A. In this case an additional combustion chamber with optional ignition device must be formed between the rotary pistons and the exhaust gas collection pipe, or an ignition of fuel-air mix must take place in the pipe described as an exhaust gas collection pipe, in order that the exhaust gas can flow in the reverse direction through the engine units.

Figure 4:
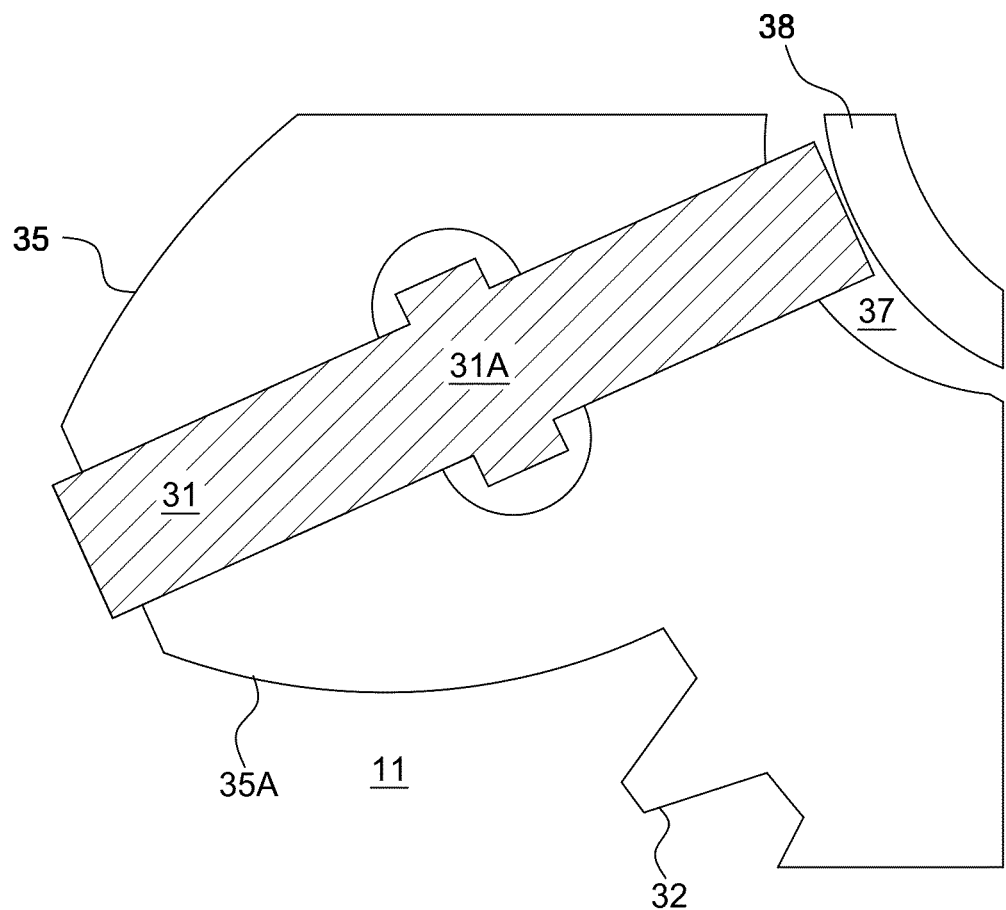
FIG. 4 is an enlarged cut-out from FIG. 3.

An enlarged cut-out of the rotary piston 30 is shown in FIG. 4. The sealing strip 31 projects radially outwards over the bulge portion 35 and projects inwards into the cavity 37 in which the hollow tube 38 is arranged. The sealing strip 31 has in a central region a thickened area 31A. The gap or slot for the sealing strip has at a corresponding position a recess (retaining groove), into which the thickened area 31A projects. The sealing strip 31 thus has a cross-shaped cross-section. The sealing strip 31 is hereby held in the slot and cannot exit the slot either radially outwards or radially inwards. The cross-section dimensions of the sealing strip 31 and the position of the recess on the slot are selected so that the sealing strip 31 projects into the cavity 37 and (when the engine unit is stationary) compresses the tube 38. The tube 38 is therefore pre-tensioned and causes, in the stationary state or upon start-up of the engine unit, a sealing contact of the sealing strip 31 with the inner wall of the housing. The tube 38 has a round cross-section which can be circular-shaped without pre-tension and, through the pre-tension against the sealing strip 31, can have an arched or oval shape. At higher speeds of the engine the centrifugal forces also cause a pressure of the sealing strip outwards and thus provide a sealing effect. In order to ensure that the pressure of the sealing strips outwards does not become unnecessarily great and produce unnecessary friction, through the thickened area 31A a movement space of the sealing strip 31 is outwardly limited. If at higher centrifugal forces the sealing strip 31 is pushed outwards through its own weight, the silicone tube 38B is hereby unburdened, which has a positive effect on the service life of the silicone tube 38.

Figure 5:
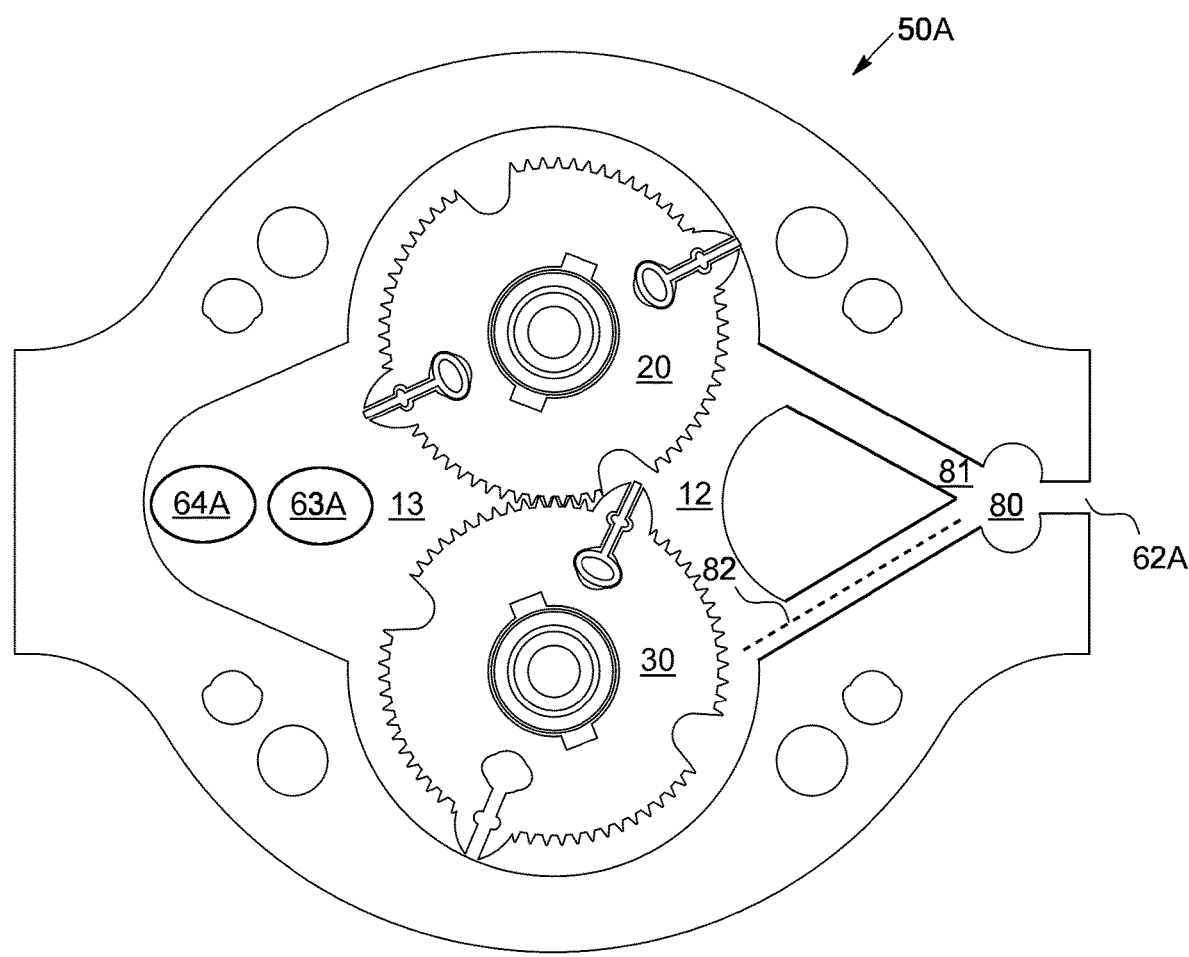
FIG. 5 is a schematic cross-sectional view of a further exemplary embodiment of an engine unit of an internal combustion engine according to the invention.

FIG. 5 shows a cross-section of an engine unit 50A of a further embodiment. The engine unit 50A here comprises a combustion chamber 80 which is located between the closable inlet opening 62A and the working space 11 of the rotary pistons. An ignition device can be arranged on the combustion chamber 80 in order to ignite a fuel-air mix introduced via the inlet opening 62A. (In configurations without a separate combustion chamber 80, an ignition device can also be provided on the inflow region 12 of the working space, in order to ignite the fuel-air mix there). From the combustion chamber 80 the exhaust gases produced through the combustion pass through two channels 81 and 82 to reach the working space. Through the orientation of the channels 81 and 82 a flow of the exhaust gas against the bulge portions of the rotary pistons is to be promoted. For this, the respective longitudinal axis of each channel 81, 82 is orientated so that it extends approximately perpendicular to the axes of rotation of the rotary pistons and radially further outwards past the axes of rotation. The longitudinal axis of the channel 82 is shown in FIG. 5 as a broken line. As shown, this longitudinal axis does not run to the mid-point of the rotary piston 30 but instead radially further outwards past it (i.e. not between the two rotary pistons, but instead on a side of the rotary piston 30 that is remote from the other rotary piston 20). In this way a greater pressure is exerted upon the bulge portions on the rotary pistons.

A combustion chamber 80 with ignition device can also be omitted if, in the feed-line pipe located upstream thereof, an ignition of a fuel-air mix takes place. The orientation of the channels 81, 82 can in this case also be as described for FIG. 5.

An exhaust gas line can run from a preceding engine unit, opening either into the combustion chamber 80 or directly into the inflow region 12 (not shown). It can be advantageous for it to open into the combustion chamber 80 in order that mixing with the fuel-air mix can also take place there.

As it is possible with the engine units of the internal combustion engine according to the invention to switch between a parallel and a serial operation and some engine units are thus flowed through either only by exhaust gas of a preceding engine unit or directly by the exhaust gases produced through combustion, an improved level of efficiency can be achieved over a large power output range.

The invention claimed is:
1. An internal combustion engine, comprising
a plurality of engine units, each having:
  a working space, in which two rotary pistons are arranged so as to mesh with each other and thereby divide the working space into an inflow region and an outflow region, wherein the rotary pistons are arranged to be driven by fluid flowing through the working space;
  a closable inlet opening leading to the inflow region; and
  a closable exhaust gas outlet opening leading away from the outflow region;
a feed-line pipe connected to the inlet openings, and an exhaust gas collection pipe connected to the exhaust gas outlet openings, so that the engine units are connected parallel to each other;
exhaust gas lines, each leading from an outflow region of one of the engine units to an inflow region of another of the engine units, producing a serial connection between the engine units; and
a control device which is configured, in dependence upon a desired power output, to operate at least some of the engine units either as internal combustion engines, wherein the inlet opening of the respective engine unit is opened to the feed-line pipe, or as expansion engines, wherein the respective inlet opening remains closed and the respective rotary pistons are instead driven by exhaust gas flowing in via the respective exhaust gas line.

2. The internal combustion engine as defined in claim 1, wherein:
the control device is configured to close the exhaust gas outlet opening of one of the engine units to the exhaust gas collection pipe and to guide exhaust gas solely via the associated exhaust gas line to the subsequent engine unit if this subsequent engine unit is operated as an expansion engine.

3. The internal combustion engine as defined in claim 1, wherein:
fresh air is supplied via the feed-line pipe;
each engine unit comprises an injection nozzle for injecting fuel, which is burned within the engine unit;
the control device is configured so that, if an engine unit is operated as an internal combustion engine, fuel is injected and its inlet opening to the feed-line pipe is opened, and, if an engine unit is operated as an expansion engine, no fuel is injected and the inlet opening is not opened.

4. The internal combustion engine as defined in claim 1, wherein:
a fuel-air mix is supplied via the feed-line pipe,
the control device is configured so that, if an engine unit is operated as an internal combustion engine, the fuel-air mix is introduced via the inlet opening and burned in this engine unit and, if an engine unit is operated as an expansion engine, no fuel-air mix is let in via the closable inlet opening and instead the exhaust gas outlet opening of a respectively preceding engine unit is closed, in order for exhaust gas of the preceding engine unit to be received via the associated exhaust gas line.

5. The internal combustion engine as defined in claim 1, wherein: the control device is configured:
in a full load operation, to operate all engine units as internal combustion engines,
in a partial load operation, wherein half of the engine units are to be operated as internal combustion engines, to select engine units for operation as internal combustion engines so that between two engine units operated as internal combustion engines there is always one engine unit operated as an expansion engine.

6. The internal combustion engine as defined in claim 1, wherein:
the control device includes operational settings that determine, in dependence upon the desired power output, how much exhaust gas is directed from one of the engine units to the next respective one and whether or how much fuel is introduced into the respective engine unit.

7. The internal combustion engine as defined in claim 1, wherein:
the engine units each comprise a movable closure body configured to be moved between different positions in which it either closes the exhaust gas outlet opening to the exhaust gas collection pipe and opens the exhaust gas line to a subsequent engine unit, or opens the exhaust gas outlet opening to the exhaust gas collection pipe and closes the exhaust gas line to a subsequent engine unit.

8. The internal combustion engine as defined in claim 1, wherein:
the control device is configured so that, with decreasing desired output power, the operation of an increasing number of the engine units is changed from an operation as an internal combustion engine to operation as an expansion engine.

9. The internal combustion engine as defined in claim 1, wherein:
the control device is configured to set an increasingly high exhaust gas output from a first engine unit to a subsequent, second engine unit, and a correspondingly lower exhaust gas output from the first engine unit to the exhaust gas collection pipe, the smaller the amount of fuel that is guided to the second engine unit.

10. The internal combustion engine as defined in claim 1, wherein:
each engine unit has a combustion chamber, into which the respective inlet opening opens, wherein two channels lead from the combustion chamber to a jacket area of the working space, said channels being orientated so that their longitudinal axes point radially further outwards past the axes of rotation of the two rotary pistons.

11. The internal combustion engine as defined in claim 1, wherein:
for cooling the inflow region or a combustion chamber of one of the engine units, a fuel line runs adjacently to said inflow region or said combustion chamber.

12. The internal combustion engine as defined in claim 1, wherein:
each rotary piston has at least two cavities, in each of which an elastic tube or an elastic rod is received, and each rotary piston has on its outer circumference at least two sealing strips, which project into the cavities and are pushed radially outwards by the elastic tube or the rod received therein.

13. The internal combustion engine as defined in claim 1, wherein:
the control device is configured so that, upon a switchover in the operation of an engine unit from operation as an internal combustion engine to operation as an expansion engine, a transmission ratio, with which said engine unit is coupled to a common drive shaft, is simultaneously also switched.

14. A method for operating an internal combustion engine, the internal combustion engine comprising a plurality of engine units, each having: a working space, in which two rotary pistons are arranged so as to mesh with each other and thereby divide the working space into an in-flow region and an outflow region, wherein the rotary pistons are driven by fluid flowing through the working space; a closable inlet opening leading to the inflow region; and a closable exhaust gas outlet opening leading away from the outflow region; the internal combustion engine further comprising a feedline pipe which is connected to the inlet openings, and an exhaust gas collection pipe which is connected to the exhaust gas outlet openings, so that the engine units are connected parallel to each other; and the internal combustion engine further comprising exhaust gas lines, each leading from an outflow region of one of the engine units to an inflow region of another of the engine units, producing a serial connection between the engine units, the method comprising:
variably setting, in dependence upon a desired power output, how many of the engine units are operated as internal combustion engines,
wherein the inlet opening of the respective engine unit is opened to the feed-line pipe, or as expansion engines, wherein the respective inlet opening remains closed, and the respective rotary pistons are driven instead by exhaust gas flowing in via one of the exhaust gas lines from another of the engine units.

* * * * *